United States Patent Office 3,108,211
Patented Oct. 22, 1963

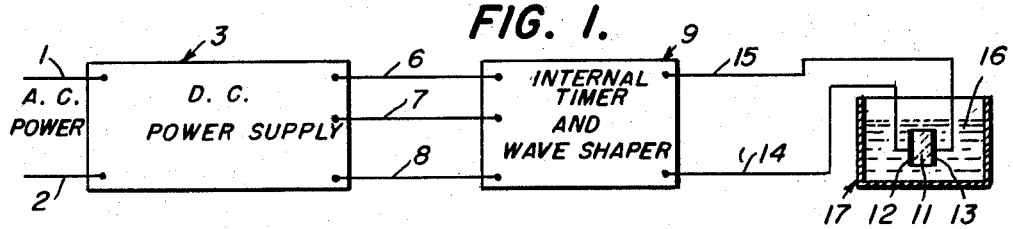
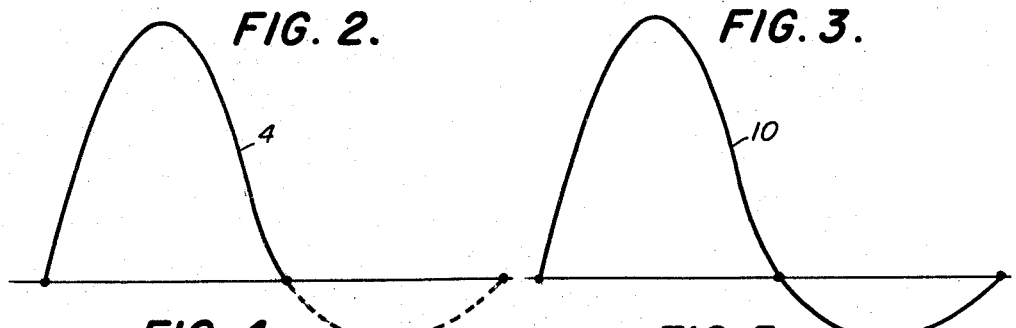
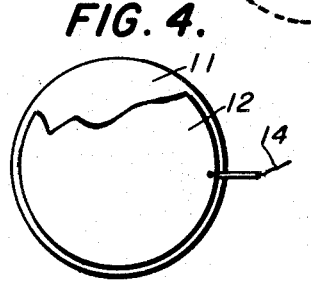
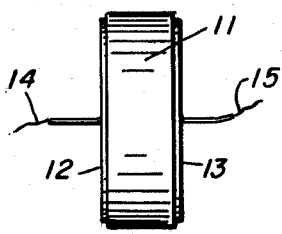
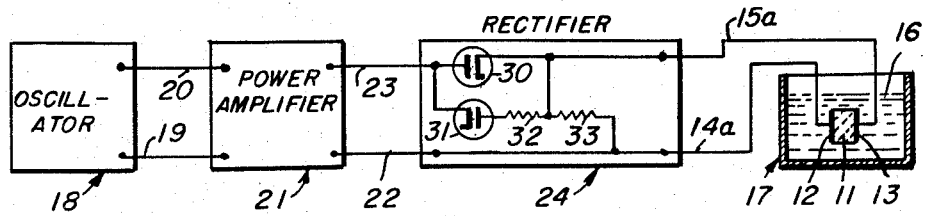
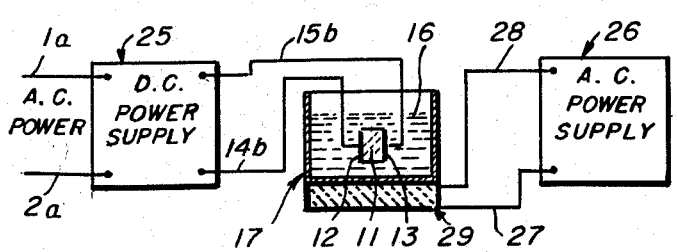

3,108,211
ACTIVATION OF FERROELECTRIC ELEMENTS
Ray S. Alleman, Monterey Park, Jack D. Baker, Tujunga, William A. Daniel, Van Nuys, and Ralph C. Struthers, North Hollywood, Calif., assignors to Electro Sonic Industries, Inc., San Fernando, Calif.
Filed Aug. 8, 1960, Ser. No. 48,242
9 Claims. (Cl. 317—262)

This invention relates to a new method for activating ferroelectric elements, and more particularly to an external electric field of alternating current where one-half of each cycle has a greater amplitude than the other half cycle and at temperatures outside the transition ranges of the said elements, to impart to said elements increased dielectric properties and enhanced electromechanical properties; and to accomplish this process in a shorter time than by previous methods.

The primary object of our invention is to provide an improved method for activating ferroelectric elements.

One object of our invention is to provide a method of activating ferroelectric elements which have enhanced electromechanical properties by subjecting said elements to sudden mechanical shocks created by reversals of the electric field every one-half cycle.

It is a further object of this invention to provide a method of producing said electric field of alternating current by having within one cycle of said current, one-half cycle of greater amplitude than the other one-half cycle.

A still further object of the invention is a mechanical excitation of the said element to be polarized by another transducer element of suitable resonant frequency coupled to said element being polarized by suitable means, which mechanically shocks the domain structure into a free state in which it can then be more readily polarized by an external D.-C. field.

It is additionally an object of our invention to provide a method of producing a quick energy decay of said ferroelectric element at the end of each one-half cycle by a reversal of the current at the end of each one-half cycle.

It is also an object of this invention to provide a high mechanical shock to the said ferroelectric elements at the end of each one-half cycle by subjecting them to an electrical impulse at the beginning of each one-half cycle.

It is additionally an object of our invention to provide a method of activating said ferroelectric elements in a shorter time than by previously known methods by use of both mechanical and electrical shock by use of said alernating current and excitation of said transducer element of suitable resonant frequency.

For the purpose of this invention, examples of ferroelectric materials to which this invention relates (but not necessarily restricted to) are: Barium titanate; barium titanate with additives such as the titanates of calcium, strontium, lead, magnesium, the stanates, tungstenates, bismuth oxide; also such combinations as lead titanate-lead zirconate, materials with alkaline and rare earth additives, lead niobates with alkaline and rare earth additives, etc.

Also for the purpose of our invention a transition point is defined as the range of temperatures at which these and other examples of ferroelectric material change crystal structure.

Other objects and advantages of our invention will become apparent to those skilled in the art from the following detailed description and accompanying drawings wherein there is illustrated methods of polarizing the said ferroelectric elements.

FIGURE 1 shows a complete low frequency polarization system in block diagram.

FIGURE 2 is a typical partial wave form as is generated from a low frequency polarizer;

FIGURE 3 is a typical wave form as generated by a method of this invention;

FIGURE 4 is a face view of a ferroelectric element;

FIGURE 5 is an edge view of a ferroelectric element;

FIGURE 6 is another form of the invention which shows a method of creating the wave form of FIGURE 3.

FIGURE 7 is a block diagram of another method of polarization utilizing a sonic bath for agitation of the element being polarized.

Looking now first at FIGURES 1 and 2, the low frequency polarizer shown comprises power lines 1 and 2, which are connected to the D.-C. power supply 3, and within power supply 3 are transformers, rectifiers, and other components (not shown) required to give a pulsing D.-C. positive voltage curve 4 or D.-C. negative voltage curve 5. The said voltage curve 4 is carried by circuit 6, and the said voltage curve 5 is transmitted by circuit 7, and circuit 8 is the common or ground terminal. These input circuits 6, 7, and 8 are switched through a suitable internal shaper-timer 9, which generates a wave form curve 10 as shown in FIGURE 3. A ferroelectric material 11, having electrode 12 and electrode 13, is connected to the output of internal timer and wave shaper 9 by a ground lead 14 and voltage lead 15. The ferroelectric material 11 and electrodes 12 and 13 are immersed in a suitable fluid 16. Fluid 16 is within an appropriate container 17.

The next method reference is made to FIGURE 6. An oscillator 18 generates an A.-C. voltage which appears on leads 19 and 20. The frequency is, or approximates, the ferroelectric material's resonant frequency. Power amplifier 21 amplifies the A.-C. signal appearing on leads 19 and 20 to suitable power levels which appears on ground lead 22 and signal lead 23. The rectifier 24 rectifies (or passes) the appropriate magnitudes of the signal appearing on leads 22 and 23 to the ground lead 14A and signal lead 15A respectively. The FIGURE 3 voltage curve 10 appears on the rectifier output leads 14A and 15A. Lead 14A is connected to electrode 12 and lead 15A is connected to electrode 13. The ferroelectric material 11 with electrodes 12 and 13 is immersed in an appropriate fluid 16. Fluid 16 is within a suitable container 17.

FIGURE 7 shows the next method to be described. Power lines 1A and 2A provide power for the D.-C. power supply 25. The D.-C. power supply 25, using the required transformers, rectifiers, and other appropriate components (not shown), supplies a positive (or negative) steady D.-C. voltage of the proper magnitude to ground lead 14B and signal lead 15B. Ground lead 14B is connected to electrode 12 and signal lead 15B is connected to electrode 13. The ferroelectric material 11 with electrodes 12 and 13 is immersed in an appropriate fluid 16. Fluid 16 is within an appropriate container 17. Fluid 16 is agitated by a suitable transducer 29 affixed to container 17. Transducer 29 is powered by an A.-C. power supply 26 connected by leads 27 and 28.

*Operation of FIGURE 1*

The D.-C. power supply 3 receives its power from a suitable alternating current power source leads 1 and 2. Within this supply are transformers, rectifiers and other appropriate components required to give a pulsating D.-C. positive (or negative) variable voltage of suitable magnitudes. For purposes of explanation, but not limiting the invention to these values, we will consider the variable positive voltage to have a maximum of 50,000 volts and and the variable negative voltage to have a maximum of 500 volts.

In addition to the variable 50,000 volt output lead 6, a variable 500 volt voltage lead 7, of inverse polarity is also obtained by the same (or different) means. These two voltages (50,000 volts and 500 volts) and their ground leads 8 are applied to an interval timer and wave shaper 9. The interval timer and wave shaper 9 applies one of the voltages to the timer output 15 during its complete one-half cycle time (for example, the 50,000 volts voltage curve 4 is applied to the timer output terminals at the instant it is at zero volts and increasing). One-half cycle excursion then takes place and when it again reaches zero volts it is removed from the interval timer 9 output. In a like manner, but of the opposite polarity, the 500 volt voltage 5 is applied to the interval timer 9 output lead 15 for the same length of time (one-half cycle) but immediately following the 50,000 volt duration. This completes the explanation of one full cycle which thereafter repeats itself. The complete waveform 10 is shown in FIGURE 3.

Operation of FIGURE 6

The polarizing power source used in this method consists of an A.C. signal generator or oscillator 18. The generated voltage output of this unit is at (or near) the mechanical resonant frequency of the ferroelectric material 11 being polarized. This A.C. voltage is usually small (compared to 50,000 volts) and must be power amplified. The power amplifier 21 amplifies this small voltage to a variable amplitude voltage up to or approximately 50,000 volts. This voltage is applied to the rectifier 24. In the sample circuit shown the vacuum tube rectifier 30 will apply the positive half wave voltage 4 to the rectifier output lead 15A. During the negative half cycle the vacuum tube rectifier 31 will conduct. Resistors 32 and 33 form a voltage divider circuit which applies a portion of the 50,000 volts voltage (approximately 500 volts) to the rectifier output terminal 15A and the ground lead 14A. The resultant voltage curve 10 is shown in FIGURE 3. In the rectifier 24 it should be noted that the vacuum tube rectifiers 30 and 31 may be reversed (anode and cathode) to produce an inverse voltage waveform at the rectifier 24 output leads 14A and 15A. Also, the vacuum tube rectifiers 30 and 31 may be replaced by semiconductor diodes of the correct type.

Operation of FIGURE 7

In this method a variable D.C. voltage power supply 25 produces the desired voltages up to approximately 50,000 volts. The output 14B and 15B is a filtered D.C. output with low impedance.

Mechanical excitation of the ferroelectric material 11 to be polarized is accomplished by an external mechanical force(s). In this case it is the transducer 29 as shown, but could take any number of configuration not shown. The transducer 29 is driven at its mechanical resonant frequency by the A.C. power supply 26. This power supply 26 and transducer 29 could be any type that would produce the required mechanical vibrations at a frequency desirable for the transducer being polarized. One type is the combination of the oscillator 18 and power amplifier 21 as previously described.

We have described our invention in certain preferred embodiments, but we fully realize that many modifications will suggest themselves and we have in mind other forms in which our invention may be carried out. Accordingly, we reserve the right to make various changes in form, construction, and arrangement of parts that still fall within the spirit and scope of our invention as set forth in the claims.

What we claim as new and desire to secure by Letters Patent of the United States is as follows:

1. The method of activating a solid polycrystalline ferroelectric body to produce internal mechanical strains of substantial magnitude by applying an alternating field in which one half of the wave is of considerably greater magnitude than the other half of the wave.

2. The method of claim 1 in which said strains are produced by varying the magnitude of the alternating field within each given cycle.

3. The method of claim 1 in which said strains are produced by reversing the direction of the field within each given cycle.

4. The method of activating a solid polycrystalline ferroelectric body to impart enhanced electromechanical properties thereto, said method comprising subjecting the body to an electric potential of alternating wave form in which one half of the wave is of considerably greater magnitude than the other half, this potential being the only potential applied to the body, whereby the domains in the body will alternately be orientated into opposite directions and finally be polarized in one direction.

5. The method as defined in claim 4 wherein the frequency of the alternating potential approximates the resonant frequency of the body being activated.

6. The method as defined in claim 4 wherein there is simultaneously applied to the body a mechanical vibration approximating in frequency the resonant frequency of the body.

7. The method as defined in claim 5 wherein there is simultaneously applied to the body a mechanical vibration approximating in frequency the resonant frequency of the body.

8. Means for activating a ferroelectric body which body has electrodes attached to it, said means comprising a tank adapted to contain a liquid in which liquid the body is adapted to be immersed, and means for subjecting said body to an alternating current with one half of the waves of greater magnitude than the other, said last means including an oscillator adapted to provide an output, a pair of diodes and an impedance, means connecting one pole of the output with the anode of a first diode of the pair, a first conductor adapted to connect the cathode of said first diode to one of the electrodes of the body, a second conductor adapted to connect to the other pole of the output, said impedance being interconnected between said second conductor and the anode of the second diode, and a third conductor interconnecting the cathode of the second diode with the anode of the first diode.

9. The subject matter of claim 8 and including a shunt circuit from the cathode of the first diode to the second conductor and including a portion of said impedance.

References Cited in the file of this patent

UNITED STATES PATENTS

| | | |
|---|---|---|
| 2,237,802 | Wittke | Apr. 8, 1941 |
| 2,420,864 | Chilorusky | May 20, 1947 |
| 2,538,554 | Cherry | Jan. 16, 1951 |
| 2,928,032 | Daniel et al. | Mar. 8, 1960 |